United States Patent Office 3,787,483
Patented Jan. 22, 1974

3,787,483
VINYL ACETYLENIC CARBAMATES
James T. K. Woo and Dietrich H. Heinert, Midland, Mich., assignors to The Dow Chemical Company, Midland, Mich.
No Drawing. Filed Jan. 11, 1971, Ser. No. 105,717
Int. Cl. C07c *125/06*
U.S. Cl. 260—482 B          3 Claims

ABSTRACT OF THE DISCLOSURE

Novel carbamates are disclosed having the formula

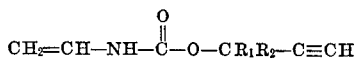

or

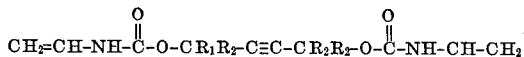

wherein $R_1$ and $R_2$ are hydrogen, lower alkyl groups, or $R_1$ and $R_2$ are joined to form a cycloalkyl group. The carbamates are useful herbicides and fungicides.

SUMMARY OF THE INVENTION

Novel vinyl acetylenic carbamates have now been discovered. They are generally viscous liquids or solid products at ambient temperatures and are soluble in many conventional organic solvents, e.g. methylene chloride, chloroform, tetrahydrofuran, etc., and mixtures thereof. The novel carbamates may be represented by the formula

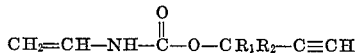 (I)

or

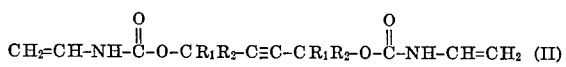 (II)

wherein $R_1$ and $R_2$ are independently hydrogen, lower alkyl groups (such as methyl, ethyl, propyl, butyl, etc.) or $R_1$ may join with $R_2$ to form a cyclic alkyl group (such as cyclohexyl, etc.). The preferred compounds are those in (I) or (II) wherein $R_1$ is hydrogen or methyl and $R_2$ is hydrogen, methyl, ethyl or propyl, or $R_1$ and $R_2$ are joined to form a cyclohexyl group.

Representative examples of the novel carbamates are those of Formulas I and II having the following values for $R_1$ and $R_2$.

TABLE I

| $R_1$ | $R_2$ | $R_1$ | $R_2$ |
|---|---|---|---|
| H | H | $CH_3$ | $CH_3$ |
| H | $CH_3$ | $CH_3$ | $C_2H_5$ |
| H | $C_2H_5$ | $C_3H_7$ | $C_3H_7$ |
| H | $C_4H_9$ | $CH_3$ | $C_4H_9$ | and those in (I) and (II) wherein $R_1$ and $R_2$ join to form a cyclohexyl ring, and the like.

The compounds may be conveniently prepared by reacting vinyl isocyanate ($CH_2$=CH—NCO) with the appropriate acetylenic alcohol

or

under conventional process conditions for reacting isocyanates with alcohols. E.g., the reaction proceeds readily at ambient or slightly higher temperatures (from about 20° C. to about 80° C.) by merely mixing the reactants. Anhydrous conditions are preferred. Reaction solvents, such as tetrahydrofuran, are used advantageously as are the conventional catalysts such as dibutyltin dilaurate, triethylenediamine (1,4 - diazabicyclo[2.2.2]octane), and the like.

SPECIFIC EMBODIMENTS

The following examples further illustrate the invention:

EXAMPLE 1

N-vinyl propynyl carbamate

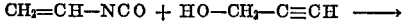

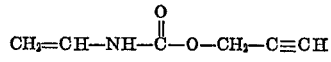

Freshly distilled vinyl isocyanate (22 g., 0.319 mole), hereafter VNCO, was gradually added over a two-hour period to propargyl alcohol (40 g., 0.715 mole) with stirring. During the addition, the reaction temperature was maintained below 40° C. A yellow solid precipitated from the reaction mixture over the course of approximately 16 hours. The solid was removed from the reaction mixture by filtration and recrystallized from n-hexane to give the desired product as a white solid (71% yield, based on vinyl isocyanate) melting at 35° C. The product structure was determined by infrared spectroscopy (IR), nuclear magnetic spectroscopy (NMR) and elemental analysis. $C_5H_7NO_2$: Calc. (percent): C, 57.60; H, 5.60; N, 11.20. Found (percent): C, 57.20; H, 5.87; N, 10.80.

EXAMPLE 2

N-vinyl 1-ethynylcyclohexyl carbamate

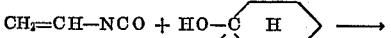

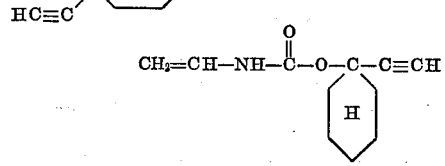

VNCO (15.2 g., 0.22 mole) was slowly added with stirring to 1-ethylnyl-1-cyclohexanol (24.8 g., 0.2 mole) in 20 ml. of dry toluene. Five drops of dibutyltin dilaurate were included in the reaction mixture as a catalyst. The reaction temperature was raised from 40° C. to 65° C. during the addition and was stirred for 30 minutes under ambient conditions after the addition was complete. The solvent was removed from the reaction mixture under reduced pressure leaving 37 g. (95.8% of theory, based on the acetylenic alcohol reactant) of a white solid melting at 52°–55° C. The product was free of starting materials and polymeric by-products. The product structure was confirmed by IR, NMR and elemental analysis. $C_{11}H_{15}NO_2$: Calc. (percent): C, 68.4; H, 7.8; N, 7.3. Found (percent): C, 68.0; H, 7.6; N, 7.5.

EXAMPLES 3-5

In like manner, the following products are obtained by mixing vinyl isocyanate (VNCO) with the appropriate alcohol:

TABLE II

| Ex. | Reactants | Product | Catalyst | Yield, percent | Product description |
|---|---|---|---|---|---|
| 3 | VNCO+HO—CH(C₃H₇)—C≡CH → | CH₂=CH-NH-C(=O)-O-CH(C₃H₇)-C≡CH | Diazabicyclooctane. | 89.8 | A yellow oil containing a minor amount of unreacted alcohol. |
| 4 | VNCO+HO—C(CH₃)(C₂H₅)—C≡CH → | CH₂=CH—NH—C(=O)—O—C(CH₃)(C₂H₅)—C≡CH | Dibutyltin dilaurate. | 92.3 | A clear viscous liquid. Elemental analysis results: C, 64.4; H, 7.9; N, 8.4. |
| 5 | VNCO+HO-CH₂-C≡C-CH₂-CH → | CH₂=CH—NH—C(=O)—O—CH₂—C≡≡≡ CH₂=CH—NH—C(=O)—O—CH₂—C | None | (¹) | A pale yellow solid; m.p. 178° C. Elemental analysis results: C, 53.7; H, 5.6; N, 12.7. Recrystallized from a 3:2 (v./v.) mixture of CHCl₃ and tetrahydrofuran. |

¹ Not measured.

Toluene was used as the solvent in Examples 3 and 4. Tetrahydrofuran was used as the solvent in Example 5. The products were obtained in essentially pure form, i.e. free of starting materials and polymeric by-products. The percent yield is percent of theory, based on the acetylenic alcohol reactant.

In like manner,

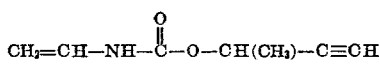

is produced by reacting VNCO with
$$HO—CH(CH_3)—C≡CH;$$

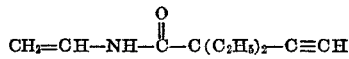

is prepared by reacting VNCO with
$$HO—C(C_2H_5)_2—C≡H;\ etc.$$

The compounds of the present invention are useful for preventing or retarding the growth of a number of seed and plant species, including fungal organisms as well as other higher plants. The effectiveness of the compounds will vary from plant species to plant species, as would be expected. For such uses, the compounds are dispersed on an inert, finely divided solid and employed as dusts. Alternatively, the compounds can be dispersed in water (with or without the aid of a surfactant) and applied as sprays or drenches. In other suitable procedures, the compounds can be employed as active constituents in oil-in-water or water-in-oil emulsions and applied as sprays, drenches or by other such conventional means. In representative operations, an aqueous composition containing the product of Example 1 as the sole active ingredient was applied at a dosage rate of 20 lbs./acre to a flat of bean plants as a pre-emergence herbicide. Fifty percent of the bean plants were either killed or their growth substantially retarded.

In like manner, the product of Example 4 is a pre-emergence herbicide at a dosage rate of 20 lbs./acre against pig weeds, wild mustard (charlock), barnyard grass and wild oats. Additionally, the product of Example 4 is an effective fungicide. The product was tested in a nutrient agar medium containing the test compound as the sole toxicant at a concentration of 500 p.p.m.; the agar medium was divided and separate portions were inoculated with viable cell suspensions of (a) *Trichopton mentagrophytes*, (b) *Pullularia pullulans*, (c) *Rhizopus nigrican*, (d) *Ceratocystis ips* and (e) *Trichoderm sp.* The nutrient agar test samples were maintained under conditions conducive to fungal growth and compared against control samples which were prepared and maintained under the same conditions except for the inclusion of the test compound. The growth of the control fungi was luxuriant while the growth of the fungi in the test media was controlled completely or substantially inhibited.

In like manner, the product of Example 2 at 20 lbs./acre was an excellent herbicide against pig weeds, wild mustard, bindweed and yellow foxtail. It was also an excellent fungicide at the same concentration against all the fungi named in the preceding paragraph as well as *Staphylococcus aureus, Candia albicans, Bacillus subtilis, Aspergillus terreus, Candida pelliculosa* and *Mycobacterium phlei*.

The product of Example 5 was effective as a pre-emergence herbicide (0.4% concentration-spray) against wild mustard.

The remaining compounds of the invention are likewise useful as herbicides and/or fungicides when similarly applied.

We claim:

1. A compound of the formula

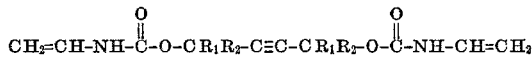

wherein R₁ and R₂ are hydrogen or lower alkyl or R₁ and R₂ are joined to form a cycloalkyl group.

2. The compound defined by claim 1 wherein R₁ is hydrogen or methyl and R₂ is hydrogen, methyl, ethyl or propyl, or R₁ and R₂ are joined to form a cyclohexyl group.

3. The compound defined by claim 2 wherein R₁ and R₂ are each hydrogen.

References Cited

UNITED STATES PATENTS 2,844,590  7/1958  Cameron _____ 260—482 C
3,203,949  8/1965  Hopkins _____ 260—482 C LORRAINE A. WEINBERGER, Primary Examiner P. J. KILLOS, Assistant Examiner U.S. Cl. X.R.

71—106; 260—482 C; 424—300